United States Patent
Rasanen et al.

(10) Patent No.: US 10,708,846 B2
(45) Date of Patent: Jul. 7, 2020

(54) MECHANISM FOR OPTIMIZING COMMUNICATION NETWORK SETTING FOR MOVING COMMUNICATION ELEMENTS

(71) Applicant: NOKIA SOLUTIONS AND NETWORKS OY, Espoo (FI)

(72) Inventors: John Juha Antero Rasanen, Espoo (FI); Michael John Rooke, Hyvinkää (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 41 days.

(21) Appl. No.: 15/775,035

(22) PCT Filed: Nov. 11, 2015

(86) PCT No.: PCT/EP2015/076316
§ 371 (c)(1),
(2) Date: May 10, 2018

(87) PCT Pub. No.: WO2017/080596
PCT Pub. Date: May 18, 2017

(65) Prior Publication Data
US 2018/0332524 A1    Nov. 15, 2018

(51) Int. Cl.
*H04W 40/24* (2009.01)
*H04W 28/24* (2009.01)
(Continued)

(52) U.S. Cl.
CPC ......... *H04W 40/246* (2013.01); *H04W 4/029* (2018.02); *H04W 4/40* (2018.02);
(Continued)

(58) Field of Classification Search
None
See application file for complete search history.

(56) References Cited

U.S. PATENT DOCUMENTS

| | | | | |
|---|---|---|---|---|
| 2004/0121774 A1* | 6/2004 | Rajkotia | ............... | H04W 36/32 455/441 |
| 2006/0227744 A1* | 10/2006 | Metke | ................... | H04W 36/32 370/331 |
| 2010/0254346 A1* | 10/2010 | Jain | ................... | H04W 36/0055 370/331 |

FOREIGN PATENT DOCUMENTS

| | | |
|---|---|---|
| EP | 2 088 807 A2 | 8/2009 |
| WO | WO 2014/071974 A1 | 5/2014 |

OTHER PUBLICATIONS

International Search Report & Written Opinion dated Jul. 20, 2016 corresponding to International Patent Application No. PCT/EP2015/076316.

(Continued)

*Primary Examiner* — Brian S Roberts
(74) *Attorney, Agent, or Firm* — Squire Patton Boggs (US) LLP

(57) ABSTRACT

An apparatus comprising at least one processing circuitry, and at least one memory for storing instructions to be executed by the processing circuitry, wherein the at least one memory and the instructions are configured to, with the at least one processing circuitry, cause the apparatus at least: to acquire connection information including at least one of route information and resource requirement information for at least one communication element in a coverage area of a communication network, the communication network comprising a plurality of access points allowing the at least one communication element to communicate with the communication network, to process the acquired connection information for determining at least one candidate for a following access point to be connected to by the at least one communication element following to an access point to which the at least one communication element is currently connected, and to use a result of the determination of the at least one (Continued)

candidate for a following access point for optimizing communication settings in the communication network for the at least one communication element moving in the communication network.

22 Claims, 9 Drawing Sheets

(51) Int. Cl.
*H04W 4/029* (2018.01)
*H04W 36/00* (2009.01)
*H04W 4/40* (2018.01)
*H04W 36/32* (2009.01)
*H04W 88/10* (2009.01)
*H04W 36/24* (2009.01)

(52) U.S. Cl.
CPC ....... *H04W 28/24* (2013.01); *H04W 36/0083* (2013.01); *H04W 36/00835* (2018.08); *H04W 36/32* (2013.01); *H04W 88/10* (2013.01); *H04W 36/245* (2013.01)

(56) References Cited

OTHER PUBLICATIONS

3GPP TR 22.885 V0.2.0 (Apr. 2015), Technical Report, 3rd Generation Partnership Project; Technical Specification Group Services and System Aspects; Study on LTE Support for V2X Services (Release 14), Apr. 2015.
LG Electronics Inc.: "Proposed study on LTE-based V2X," 3GPP Draft; S1-150284, 3GPP TSG-SA WG1 Meeting #69, Sanya, P.R. China, Feb. 2-6, 2015.

* cited by examiner

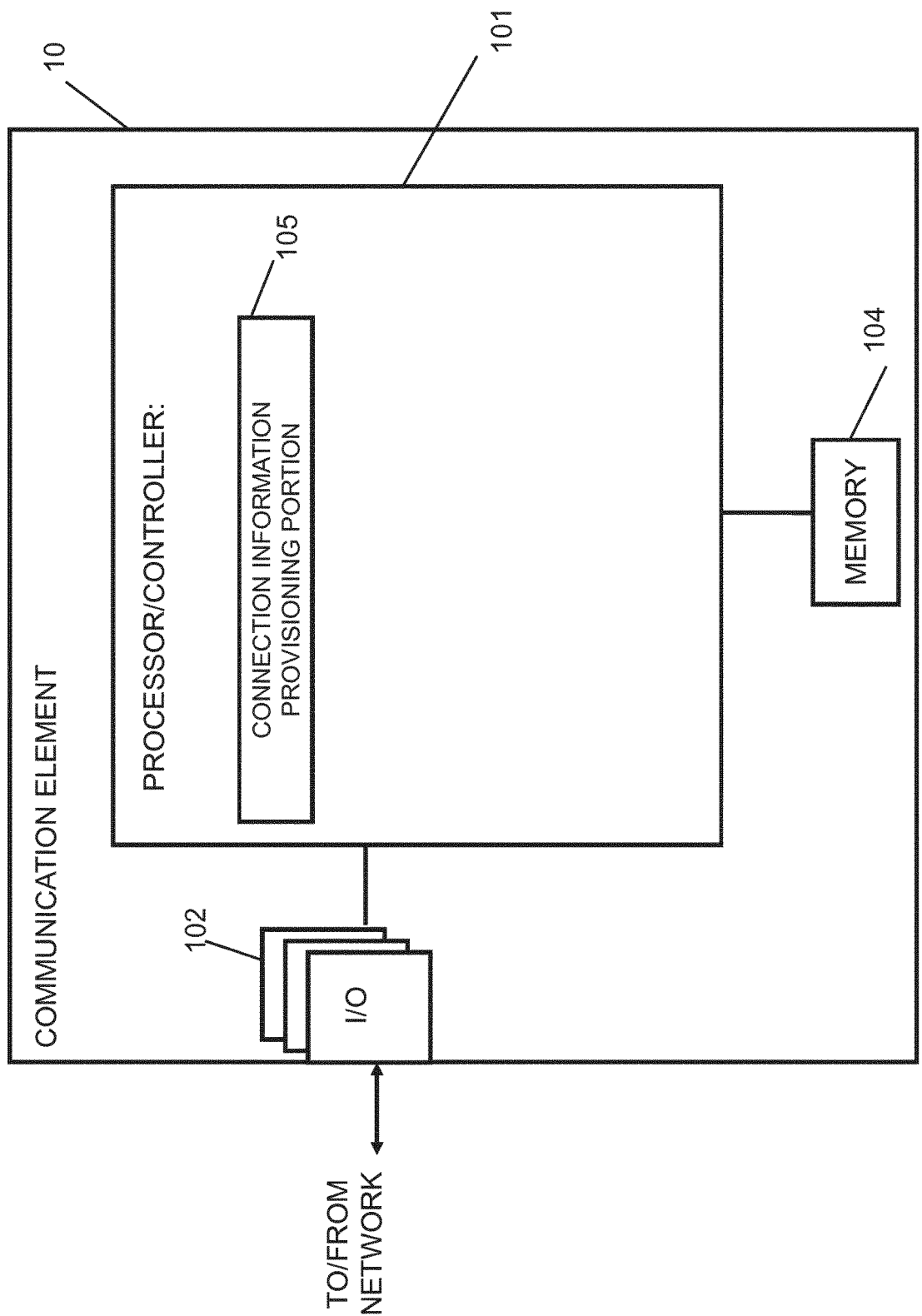

MECHANISM FOR OPTIMIZING COMMUNICATION NETWORK SETTING FOR MOVING COMMUNICATION ELEMENTS

BACKGROUND

Field

The present invention relates to apparatuses, methods, systems, computer programs, computer program products and computer-readable media usable for optimizing communication network settings for moving communication elements, such as vehicle based communication equipment.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:

3GPP 3$^{rd}$ Generation Partner Project
AP: access point
BS: base station
CE: communication element
CF: control function
CPU: central processing unit
eNB: evolved node B
EPC: evolved packet core
ETSI European Telecommunications Standards Institute
GW: gateway
HW: hardware
ID: identification, identifier
IMS: IP multimedia subsystem
ISG: intelligent transportation system
LTE: Long Term Evolution
LTE-A: LTE Advanced
MEC: mobile edge computing
NFV: network function virtualization
RBS: radio base station
RES: radio edge server
SDN software defined networks/networking
SW: software
UE: user equipment
UMTS: universal mobile telecommunication system
V2I: vehicle to/from infrastructure
V2P: vehicle to/from person
V2V: vehicle to/from vehicle
V2X vehicle to/from X
VM: virtual machine
VNF: virtual network function Embodiments of the present invention are related to procedures allowing to adapt a communication network to requirements of a moving communication element, such as a vehicle or the like, and to optimize settings in the communication network, wherein the procedures are considering also considered for various types of environments in particular a virtualized environment comprising at least one virtualized network function.

SUMMARY

According to an example of an embodiment, there is provided, for example, an apparatus comprising at least one processing circuitry, and at least one memory for storing instructions to be executed by the processing circuitry, wherein the at least one memory and the instructions are configured to, with the at least one processing circuitry, cause the apparatus at least: to acquire connection information including at least one of route information and resource requirement information for at least one communication element in a coverage area of a communication network, the communication network comprising a plurality of access points allowing the at least one communication element to communicate with the communication network, to process the acquired connection information for determining at least one candidate for a following access point to be connected to by the at least one communication element following to an access point to which the at least one communication element is currently connected, and to use a result of the determination of the at least one candidate for a following access point for optimizing communication settings in the communication network for the at least one communication element moving in the communication network.

Furthermore, according to an example of an embodiment, there is provided, for example, a method comprising acquiring connection information including at least one of route information and resource requirement information for at least one communication element in a coverage area of a communication network, the communication network comprising a plurality of access points allowing the at least one communication element to communicate with the communication network, processing the acquired connection information for determining at least one candidate for a following access point to be connected to by the at least one communication element following to an access point to which the at least one communication element is currently connected, and using a result of the determination of the at least one candidate for a following access point for optimizing communication settings in the communication network for the at least one communication element moving in the communication network.

Moreover, according to an example of an embodiment, there is provided, for example, a computer program product, comprising a computer usable medium having a computer readable program code embodied therein, the computer readable program code adapted to execute a process comprising acquiring connection information including at least one of route information and resource requirement information for at least one communication element in a coverage area of a communication network, the communication network comprising a plurality of access points allowing the at least one communication element to communicate with the communication network, processing the acquired connection information for determining at least one candidate for a following access point to be connected to by the at least one communication element following to an access point to which the at least one communication element is currently connected, and using a result of the determination of the at least one candidate for a following access point for optimizing communication settings in the communication network for the at least one communication element moving in the communication network.

According to further refinements, these examples may include one or more of the following features:

for acquiring the connection information, at least one of route information and resource requirement information may be received from the at least one communication element and processed, wherein the route information may comprise an indication of at least a segment of a planned route of the at least one communication element in the coverage area of the communication network, and wherein the resource requirement information may indicate assumed resource needs of one or more communication elements including the at least one communication element;

at least one of a trigger for providing the connection information by the at least one communication element, a requested size of the connection information and a requested content of the connection information, may be determined on the basis of a network situation, and the at least one communication element may be informed about the at least one of the trigger for providing the connection information, the requested size of the connection information and the requested content of the connection information, wherein the trigger may be time based or location based;

for acquiring the connection information, a sequence of information elements each indicating a route point of the at least one communication element may be received and processed, the sequence of information elements may be stored for registering at least one route of the at least one communication element, and route information for the at least one communication element may be deduced from the registered at least one route;

an information element of the sequence of information elements indicating a route point of the at least one communication element may be received from an access point to which the at least one communication element is currently connected, and may comprise an identification element of the access point to which the at least one communication element is currently connected;

when processing the acquired connection information, at least one candidate for the following access point may be predicted, or a specific access point for the following access point may be selected;

when processing the acquired connection information, at least one of service requirements and resource requirements for a communication of the at least communication element with the determined at least one candidate for the following access point may be determined;

measures to be conducted for a communication with the at least one communication element by at least one of the determined at least one candidate for the following access point and the access point to which the at least one communication element is currently connected may be determined, and the at least one of the determined at least one candidate for the following access point and the access point to which the at least one communication element is currently connected may be informed about the determined measures for optimizing communication settings in the communication network for the at least one communication element;

measures to be conducted for a communication with the at least one communication element by at least one application server connected to or integrated with at least one of the determined at least one candidate for the following access point and the access point to which the at least one communication element is currently connected may be determined, and the at least one application server may be informed about the determined measures for optimizing communication settings in the communication network for the at least one communication element;

the measures to be conducted may be related to at least one of scaling-up of communication resources, scaling-out of communication resources, reserving of communication resources, preparing a handover of a communication connection of the at least one communication element, programming of at least one hardware accelerator, downloading of at least one software accelerator, activating of at least one software accelerator;

when determining the measures to be conducted, impacts of a communication by another communication element for which connection information is acquired on at least one of the determined at least one candidate for the following access point, the access point to which the at least one communication element is currently connected and an application server connected to or integrated with at least one of the determined at least one candidate for the following access point and the access point to which the at least one communication element is currently connected may be considered;

control information indicating a preferred access point to be selected by the at least one communication element as a following access point when moving in the communication network may be generated on the basis of the result of the determination of the at least one candidate for a following access point for optimizing communication settings in the communication network, and transmission of the generated control information to the at least one communication element may be caused;

the at least one communication element for which the connection information is acquired may be prioritized in comparison to another communication element communicating in the communication network for which no connection information is acquired;

a negotiation with the at least one communication element regarding acquiring of the connection information for the at least one communication element may be conducted, wherein the negotiation may concern at least one of whether the connection information is allowed to be acquired or not, in which locations the connection information is acquired or not, at which time the connection information is acquired or not.

the above described processing may be implemented in a control function or control element of the communication network, the control function being part of at least one of a dedicated server, a virtualized network function, a virtual machine, a mobile edge computing server, a local/regional/centralized server, local/regional/centralized gateway, wherein the at least one communication element may include at least one of a vehicle based communication device, a portable communication device, a user equipment, a V2X capable communication device, a navigation device.

In addition, according to a further example of an embodiment, there is provided, for example, an apparatus including at least one processing circuitry, and at least one memory for storing instructions to be executed by the processing circuitry, wherein the at least one memory and the instructions are configured to, with the at least one processing circuitry, cause the apparatus at least: to provide connection information to a control function of a communication network, the connection information including at least one of route information and resource requirement information for at least one communication element in a coverage area of the communication network, the communication network comprising a plurality of access points allowing the at least one communication element to communicate with the communication network, the connection information being usable for determining at least one candidate for a following access point to be connected to by the at least one communication element following to an access point to which the at least one communication element is currently connected for optimizing communication settings in the communication network for the at least one communication element moving in the communication network.

Furthermore, according to an example of an embodiment, there is provided, for example, a method comprising providing connection information to a control function of a communication network, the connection information including at least one of route information and resource requirement information for at least one communication element in a coverage area of the communication network, the communication network comprising a plurality of access points allowing the at least one communication element to communicate with the communication network, the connection information being usable for determining at least one candidate for a following access point to be connected to by the at least one communication element following to an access point to which the at least one communication element is currently connected for optimizing communication settings in the communication network for the at least one communication element moving in the communication network.

Moreover, according to an example of an embodiment, there is provided, for example, a computer program product, comprising a computer usable medium having a computer readable program code embodied therein, the computer readable program code adapted to execute a process comprising providing connection information to a control function of a communication network, the connection information including at least one of route information and resource requirement information for at least one communication element in a coverage area of the communication network, the communication network comprising a plurality of access points allowing the at least one communication element to communicate with the communication network, the connection information being usable for determining at least one candidate for a following access point to be connected to by the at least one communication element following to an access point to which the at least one communication element is currently connected for optimizing communication settings in the communication network for the at least one communication element moving in the communication network.

According to further refinements, these examples may include one or more of the following features:
- a transmission of at least one of route information and resource requirement information from the at least one communication element may be caused, wherein the route information may comprise an indication of at least a segment of a planned route of the at least one communication element in the coverage area of the communication network, and wherein the resource requirement information may indicate assumed resource needs of one or more communication elements including the at least one communication element;
- at least one of a trigger for providing the connection information by the at least one communication element, a requested size of the connection information and a requested content of the connection information, on the basis of a network situation, may be received and processed, wherein the trigger may be time based or location based;
- a transmission of an information element indicating a route point of the at least one communication element may be caused;
- the information element indicating a route point of the at least one communication element may be sent from an access point to which the at least one communication element is currently connected, and may comprise an identification element of the access point to which the at least one communication element is currently connected;
- control information indicating a preferred access point to be selected by the at least one communication element as a following access point when moving in the communication network may be received and processed, and the control information may be considered in an algorithm for selecting a following access point;
- a negotiation may be conducted with the communication network regarding a provision of the connection information for the at least one communication element, wherein the negotiation may concern at least one of whether the connection information is allowed to be provided or not, in which locations the connection information is to be provided or not, at which time the connection information is to be provided or not;
- the negotiation may be based on an input of a user of the at least one communication element;
- at least one of a content, a timing, an accuracy setting of the connection information may be variably set;
- a communication with at least one other communication element may be conducted for obtaining information regarding connection information related to the at least one other communication element, wherein the connection information being provided to the control function of the communication network may comprise an aggregated set of connection information related to the communication elements;
- the processing may be implemented in an access point of the communication network or in the at least one communication element, wherein the at least one communication element may include at least one of a vehicle based communication device, a portable communication device, a user equipment, a V2X capable communication device, a navigation device, wherein the control function of the communication network may be part of at least one of a dedicated server, a virtualized network function, a virtual machine, a mobile edge computing server, a local/regional/centralized server, local/regional/centralized gateway.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which:

FIG. 9 shows a diagram of a network element or function acting as a communication element according to some examples of embodiments.

DESCRIPTION OF EMBODIMENTS

Figure 1:
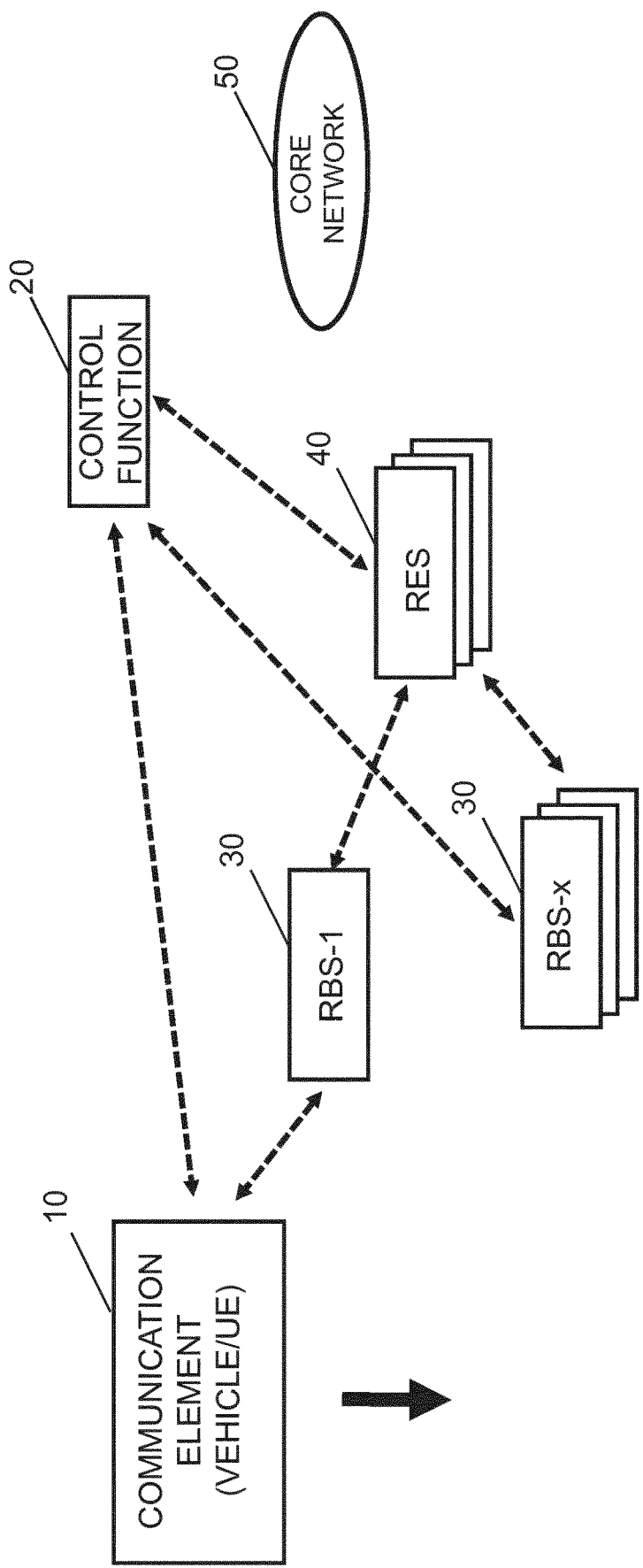
FIG. 1 shows a diagram illustrating a general architecture of a communication network where some examples of embodiments are implementable.

In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) like the Universal Mobile Telecommunications System (UMTS), fourth generation (4G) communication networks or enhanced communication networks based e.g. on LTE or LTE-A, fifth generation (5G) communication networks, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Generally, for properly establishing and handling a communication connection between two end points (e.g. communication elements, such as terminal devices, user equipments (UEs), or other communication network elements, a database, a server, host etc.), one or more network elements such as communication network control elements, for example access network elements like access points, radio base stations, eNBs etc., and core network elements or functions, for example control nodes, support nodes, service nodes, gateways etc., are involved, which may belong to one communication network system or different communication network systems.

Such communication networks comprise, for example, a large variety of proprietary hardware appliances. Launching a new network service often requires yet another appliance and finding the space and power to accommodate these is becoming increasingly difficult. Moreover, hardware-based appliances rapidly reach end of life. Due to this, it has been considered to use, instead of hardware based network elements, virtually generated network functions, which is also referred to as network functions virtualization. By means of software based virtualization technology, it is possible to consolidate many network equipment types onto industry standard high volume servers, switches and storage, which could be located in data centers, network nodes and in the end user premises, for example.

In the recent years, the virtualization of telecommunication network elements and running them on a standard Commercial of the Shelf HW platforms such as clouds has evolved. These virtualized network elements are then called VNF and are configured to run, for example, in telecommunication clouds. One example for a frame of such a telecommunication cloud is provided, for example, by ETSI NFV. For the sake of simplicity, network function virtualization will be referred to in the following as NFV.

It is to be noted that in a communication system both of a physical and a virtual network element approach may be used simultaneously and in a mixed manner, which is also referred to as a hybrid communication network (referred to hereinafter as "hybrid network"), where virtual and physical nodes, elements, functions etc. coexist and form a (dynamic) network structure. For example, a core network being employed for services comprises virtual and physical network elements or functions interacting with each other. Furthermore, also other network functions besides those of a (core) network (like EPC or IMS), such as network functions of an access network element like an eNB or BS, may be provided as virtual network functions.

As indicated above, NFV is intended to be implemented in such a manner that network functions are instantiated and located within a so-called cloud environment, i.e. a storage and processing area shared by plural users, for example. By means of this, it is for example possible to dynamically placing elements/functions of a core network in a flexible manner into the cloud.

In the future, traffic increase in mobile communication is commonly considered as a main object to be confronted, so that research for new types of communication systems, such as 5G is started. Traffic increase will happen to traditional web applications and new applications and services. For example, in addition to users, an increasing number of machines (Machine Type Communication, MTC) will be connected. Such MTC applications may cause challenges for mobile networks.

In particular, delay sensitive and mission critical applications, such as vehicular communications may require special architecture enhancements in order to be properly supported. An example of such application is, for example, V2X, where X stands for "everything" including V2P, V2I and V2V, i.e. communication between vehicle and person (e.g. handheld terminal carried by a pedestrian, cyclist, driver or passenger), between vehicle and infrastructure or between vehicle and another vehicle. V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

In addition to these new services, mobile networks will need to serve today's known applications (ranging from smart meters to broadband internet and video streaming). The mobile network architecture should then be flexible enough to host all the previously mentioned applications without compromising performance.

In order to support such diverse requirements as well as the volume growth, future networks such as a 5G based architecture enable the network to support multiple services. For enabling such support, network function virtualization (NFV) and software defined networking (SDN) may be employed. It is also important to introduce efficient service access through local, regional or centralized gateways or servers, depending on the type of application (e.g. local GW for local services, centralized GW for services such as voice or internet access).

As indicated above, fast moving vehicles, and passengers with UEs in them, may cause challenges for mobile networks, as they may require high data rates with low latency and undisrupted transmission. For example, handovers represent one challenge for the goal to guarantee reliable and undisrupted communication for autonomous vehicles, and passengers with mobile terminals.

In this context, the availability and optimal usage of network resources represents an issue. Autonomous vehicles, and future application on passengers' terminal, most probably need highly optimized and/or dedicated resources, including e.g. HW and/or SW acceleration functions, in the network. In a virtualized network unused/not-currently-needed resources are kept in power-down mode to save energy and lower network operating costs. Thus, timely scale-out and scale-up of network resources is essential.

One further research field in this connection is represented by mobile edge computing (MEC). MEC provides IT and cloud-computing capabilities within a radio access network in close proximity to mobile subscribers. For application developers and content providers, the access network edge offers a service environment with low latency and high-bandwidth as well as direct access to real-time radio network information (such as subscriber location, cell load, etc.) that can be used by applications and services to offer, for example, context-related services. Furthermore, applications and services offered by a MEC server may be provided by different service providers. Applications and services offered by a MEC server may be used by network users/subscribers either in sessions between a communication element such as a UE and the MEC server, or as intermediate data flow manipulators in sessions between a UE and e.g. the Internet.

It is a general issue in these fields to determine whether a communication element communicating in the network represents e.g. a vehicle and/or UE, users being a "moving mass" that potentially enters an area of the network which requires additional or tailored resources activated for providing an optimal radio coverage performance.

According to examples of embodiments, there are suggested a number of measures for selecting in advance, i.e. predicting, a proper access point such as a radio base station and/or a radio channel for a communication element such as a vehicle, and for adjusting and/or optimising in advance corresponding network resources for the vehicle (and/or UEs of the passengers of the vehicles) in a given area. For example, according to examples of embodiments, operations usable for optimizing handovers of fast-moving vehicles are proposed wherein also a corresponding resource management in the network, especially in a virtualized environment, is considered. For this purpose, a control function in the network is discussed, which may be implemented e.g. as a VNF/VM in a cloud based/virtualized environment. On the side of the communication element, communication systems of vehicles or a portable/standalone navigator/terminal device (such as a UE) are usable.

It is to be noted that embodiments as well as principles described below are applicable in connection with any (physical or virtual) network element or function being included in a (hybrid) communication network environment including at least one virtualized network element or function, such as a terminal device, a network element, a relay node, a server, a node, a corresponding component, and/or any other element or function of a communication system or any combination of different communication systems that support required functionalities. The communication system may be any one or any combination of a fixed communication system, a wireless communication system or a communication system utilizing both fixed networks and wireless parts. The protocols used, the specifications of networks or communication systems, apparatuses, such as nodes, servers and user terminals, especially in wireless communication, develop rapidly. Such development may require extra changes to an embodiment. Therefore, all words and expressions should be interpreted broadly and they are intended to illustrate, not to restrict, embodiments.

Furthermore, in the following, different exemplifying embodiments will be described using, as an example of a communication network to which the embodiments may be applied, a radio access architecture based on 3GPP standards, such as a fourth generation (like LTE or LTE-A) or fifth generation (5G) communication network, without restricting the embodiments to such architectures, however. It is obvious for a person skilled in the art that the embodiments may also be applied to other kinds of communication networks having suitable means by adjusting parameters and procedures appropriately, e.g. WiFi, worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), wired access, etc.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a telecommunication network including a communication system where some examples of embodiments are applicable may include an architecture of one or more communication networks including a wired or wireless access network subsystem and a core network. Such an architecture may include one or more communication network control elements, access network elements, radio access network elements, access service network gateways or base transceiver stations, such as a base station (BS), an access point (AP) or an eNB, which control a respective coverage area or cell(s) and with which one or more communication elements, user devices or terminal devices, such as a UE, or another device having a similar function, such as a modem chipset, a chip, a module etc., which can also be part of an element, function or application capable of conducting a communication, such as a UE, an element or function usable in a machine-to-machine communication architecture, or attached as a separate element to such an element, function or application capable of conducting a communication, or the like, are capable to communicate via one or more channels for transmitting several types of data. Furthermore, core network elements such as gateway network elements, policy and charging control network elements, mobility management entities, operation and maintenance elements, and the like may be included.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as an server, a radio network controller, and other elements of the same or other communication networks besides those described in detail herein below.

A communication network as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage.

Furthermore, a network element, such as communication elements, like a vehicle, a UE, access network elements, like a radio network controller, other network elements, like a server, etc., as well as corresponding functions as described herein, and other elements, functions or applications may be implemented by software, e.g. by a computer program product for a computer, and/or by hardware. For executing their respective functions, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

With regard to FIG. 1, a diagram illustrating a general architecture of a communication network is shown where some examples of embodiments are implementable. It is to be noted that the structure indicated in FIG. 1 shows only those parts and links which are useful for understanding principles underlying some examples of embodiments of the invention. As also known by those skilled in the art there may be several other network elements or devices involved e.g. in a communication which are omitted here for the sake of simplicity.

It is to be noted that examples of embodiments are not limited to the number of elements, functions, links and applications as indicated in FIG. 1, i.e. there may be implemented or instantiated less of or more of the corresponding elements, functions, applications and links than those shown in FIG. 1.

The architectural environment referred to in examples of embodiments as described below can be described as an environment where at least one communication element (CE), such as a vehicle, possibly with passengers with own mobile terminals (UEs), is connected to a mobile communication network. The mobile communication network covers a specified network area by means of access points, such as RBSs 30, which are part, for example, of an access network subsystem of the communication network and provide connection to a core network 50. As indicated by an arrow in FIG. 1, the CE 10 can move within the communication network, wherein it may switch the connection to the network due to the movement (or due to other reasons, such as load balancing or congestion avoidance) between respective access points. In the example shown in FIG. 1, it is assumed that the CE 10 is connected to RBS-1, while other RBSs (RBS-x, for example) are located at other parts of the network coverage area.

Reference sign 40 denotes one or more application servers represented by so-called radio edge servers (RES). The RES 40 may be e.g. a MEC server, a 5G server, a (local/regional/centralized) gateway or a combination of a gateway and server. For example, an RES 40 is connected to or integrated in an RBS 30.

Reference sign 20 denotes a control function. According to examples of embodiments, the control function 20 comprises radio network control functions and/or server/gateway control functions.

It is to be noted that according to various examples of embodiments, the RBS 30, the RES 40 and the control function 20 may be integrated or may run separately, for example, as VNFs on VMs in a virtualized environment or on dedicated or separate hardware. Corresponding implementation options may depend e.g. on the ability of the used communication network type.

Basically, according to examples of embodiments of the invention, the control function 20 in the network is configured to acquire connection information, such as route information and/or resource requirement information, of a communication element, such as CE 10. The control function 20 uses the acquired information to predict a next possible access point, i.e. candidates for RBSs, and/or to select the next RBS for the CE 10, when the CE 10 moves on a route deduced from the acquired information, for example. According to examples of embodiments, the control function 20 further initiates preparatory actions on the selected RBS, e.g. scale-up or scale-out of resources, resource reservation, handover preparation. In case an application server such as RES 40 is involved, the control function 20 may further initiate preparatory actions on this application server which is connected to, or integrated in, the selected access point, e.g. scale-up or scale-out of resources, re-programming programmable HW accelerators, downloading and/or activating SW accelerators, resource reservation.

According to examples of embodiments, the connection information can be acquired in different ways. For example, the control function acquires the connection information such as the route information directly from the CE 10, i.e. from the vehicle/UE. That is, the CE 10 reports its planned route, or a segment of its planned route, to the network, i.e. the control function 20, by means of a suitable signaling. As an alternative way, the network (i.e. the control function 20) deduces and/or predicts the route of the CE 10 on the basis of previously acquired information which are acquired for example from the access points to which the CE 10 is currently connected. That is, for example, the network determines a "typical path" of the CE 10 on which it is moving along (for example, driving route to work each day).

In connection with FIGS. 2 to 5, examples of embodiments for implementing the above described measures are described wherein elements being used in these examples correspond to the elements shown in FIG. 1. It is to be noted that it is assumed that a CE (i.e. vehicle, UE or the like) is attached to a mobile communication network.

Figure 2:
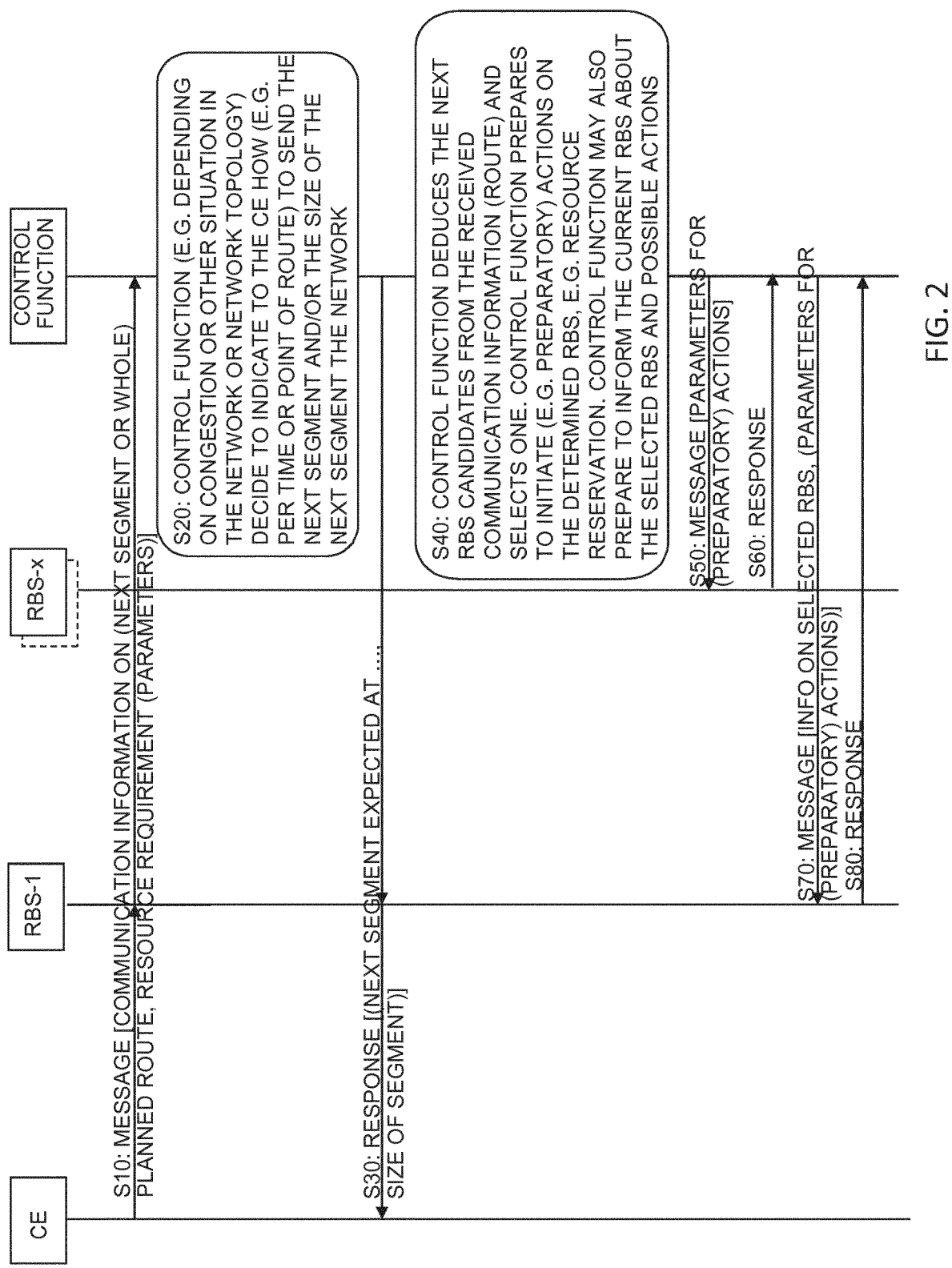
FIG. 2 shows a signaling diagram illustrating one example of a procedure for optimizing communication network settings according to examples of embodiments of the invention.

FIG. 2 shows a signaling diagram illustrating one example of a procedure for optimizing communication network settings according to examples of embodiments of the invention. Specifically, FIG. 2 is related to a case where CE 10 (e.g. a vehicle or UE) indicates, as connection information, the planned route, or the next segment of the planned route, which is activated in a navigator device of the vehicle and retrievable as route information therefrom. The control function 20 uses the information to initiate actions at an RBS (or RBSs) on the route.

In S10, the CE 10 sends a message to the control function 20 in the network via the RBS to which it is connected (i.e. RBS-1) in order to report, as connection information, the next segment of its planned route (or the whole route). The corresponding route information may originate e.g. from the navigator of the vehicle or UE. The message comprise in the shown example also further parameters, e.g. information on possibly needed resources, as part of the connection information.

In S20, the control function 20 decides, e.g. depending a current network situation or an assumed future network situation, such as congestion, or other reasons related to the network like topology, to indicate to the CE 10 how the next connection information indication is to be sent, i.e. when (e.g. per time or per point of route) the next segment of route information is to be sent. Furthermore, alternatively or additionally, also an indication of the size and/or content of the next connection information the network wants to receive may be indicated, for example, which sort of information is required or not required in the next connection information indication.

In S30, the control function 20 sends a response message to the CE 10 which may contain parameters, e.g. information regarding how the next connection information are to be provided (e.g. when the network wants the next segment of route information, the size of the next expected segment, etc.).

It is to be noted that the sequence of S10 to S30 may be executed in a repeated manner, i.e. more than one set of connection information may be provided, before the next processing is conducted.

In S40, the control function deduces, on the basis of the connection information received so far, at least one candidate for the next access point (RBS), e.g. RBS-x, wherein for example the received route information and/or the resource requirement information are used. According to some examples of embodiments, the control function selects a proper access point on the basis of the information. Then, the control function 20 conducts a processing to initiate (e.g. preparatory) actions on the selected RBS (e.g. RBS.-x) and/or the current RBS (i.e. RBS-1), e.g. scale-up or scale-out of resources, resource reservation, handover preparation. In this connection, the control function 20 may conduct a processing to inform the current RBS (RBS-1) about the selected RBS (RBS-x) and possible actions needed.

In S50, the control function 20 sends a message to the selected RBS (RBS-x) to enable this RBS to take possibly required actions, e.g. scale-up or scale-out of resources, resource reservation, handover preparation. S60 represents a response of the RBS to the message.

In S70, the control function 20 sends a message to the current RBS (RBS-1) to enable this RBS to take possibly required actions, e.g. resources adaptation and handover preparation. S80 represents a response of the RBS to the message.

Figure 3:
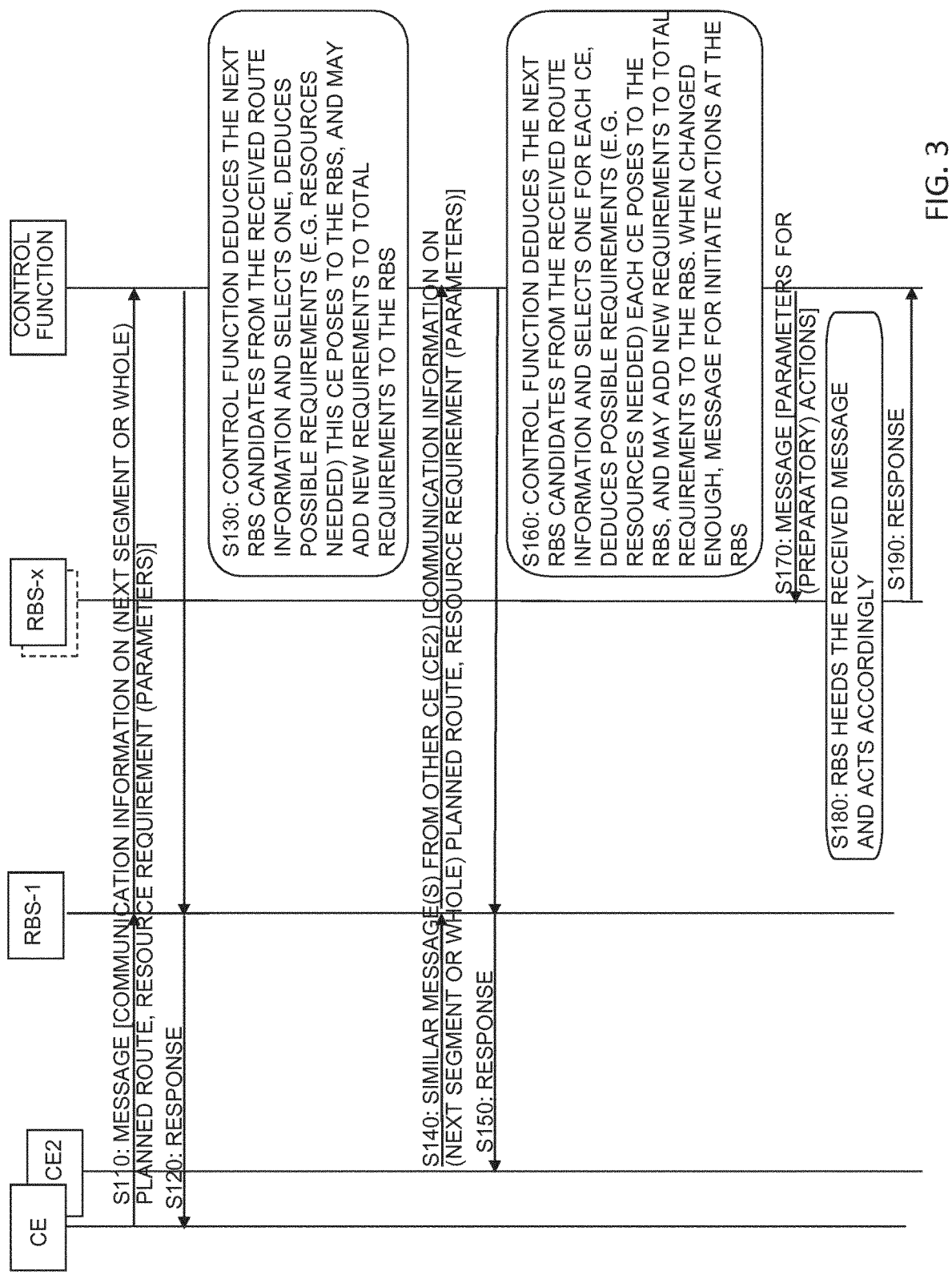
FIG. 3 shows a signaling diagram illustrating a further example of a procedure for optimizing communication network settings according to examples of embodiments of the invention.

FIG. 3 shows a signaling diagram illustrating a further example of a procedure for optimizing communication network settings according to examples of embodiments of the invention. Specifically, FIG. 3 is related to a case where a plurality of CEs (e.g. vehicles or UEs) indicate, as connection information, their planned routes, or the next segments of the planned routes, and the control function uses accumulated information to adjust available resources at RBSs on the planned routes.

In S110, one CE (e.g. CE 10) sends a message to the control function 20 in the network via the RBS to which it is connected (i.e. RBS-1) in order to report, as connection information, the next segment of its planned route (or the whole route). The corresponding route information may originate e.g. from the navigator of the vehicle or UE. The message comprise in the shown example also further parameters, e.g. information on possibly needed resources, as part of the connection information.

In S120, the control function 20 sends a response message to the CE 10 which may contain e.g. parameters regarding how the next connection information are to be provided.

In S130, the control function deduces, on the basis of the connection information received so far, at least one candidate for the next access point (RBS), e.g. RBS-x, wherein for example the received route information and or the resource requirement information of CE 10 are used. Furthermore, the control function 20 deduces possible requirements (e.g. resource needs) the CE 10 poses to the selected RBS(s).

According to some examples of embodiments, the control function 20 adds new requirements to a set of total requirements to the selected RBS.

It is of course possible that the control function 20 conducts also a processing to initiate (e.g. preparatory) actions on the selected RBS (e.g. RBS-x) and/or the current RBS (i.e. RBS-1), e.g. scale-up or scale-out of resources, resource reservation, handover preparation.

In S140, another CE (e.g. a CE2 being not shown in FIG. 1) sends a message to the control function 20 in the network via the RBS to which it is connected (e.g. again RBS-1) in order to report, as connection information, the next segment of its planned route (or the whole route). The corresponding route information may originate e.g. from the navigator of the vehicle or UE. The message may again comprise further parameters, e.g. information on possibly needed resources, as part of the connection information.

In S150, the control function 20 sends a response message to the other CE2 which may contain e.g. parameters regarding how the next connection information are to be provided.

It is to be noted that the sequence of S110 and S140 may be executed in a repeated manner, i.e. more than one set of connection information may be provided, before the next processing is conducted, wherein also more than two CEs may be involved.

In S160, the control function deduces, on the basis of the connection information received so far, at least one candidate for the next access points (RBS) for each CE of which connection information is received. According to some examples of embodiments, the control function selects a proper access point on the basis of the information. Furthermore, the control function 20 deduces possible requirements (e.g. resource needs) each CE poses to the selected RBS(s), wherein new requirements are added to a set of total requirements to each RBSs. When requirements for a given RBS have changed enough (e.g. corresponding preset thresholds are exceeded or the like), the control function 20 prepares a message to enable the initiation of actions at the RBS in question (e.g. scale-up, scale-out, scale-down or scale-in of resources).

In S170, the control function 20 sends a message to the RBSs in question (here, RBS-x) to enable this RBS to take possibly required actions, e.g. scale-up, scale-out, scale-down or scale-in of resources. Consequently, in S180, the RBS in question (i.e. RBS-x) heeds the received message and acts accordingly, e.g. adds (scale-up, scale-out) or reduces (scale-down, scale-in) resources as per the indicated needs.

In S190 the RBS sends a response to the message in S170.

Figure 4:
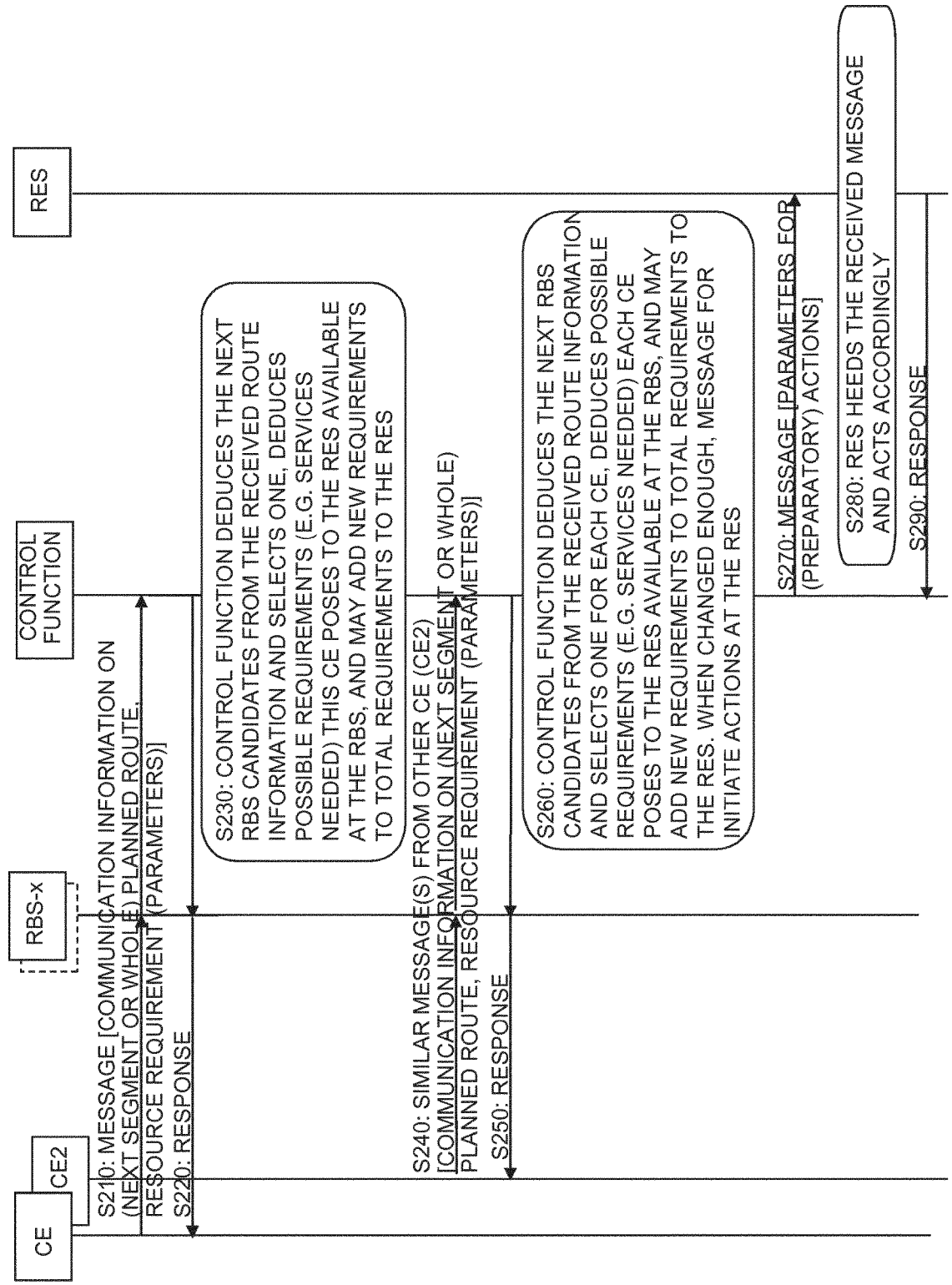
FIG. 4 shows a signaling diagram illustrating a further example of a procedure for optimizing communication network settings according to examples of embodiments of the invention.

FIG. 4 shows a signaling diagram illustrating a further example of a procedure for optimizing communication network settings according to examples of embodiments of the invention. Specifically, FIG. 4 is related to a case where a plurality of CEs (e.g. vehicles or UEs) indicate, as connection information, their planned routes, or the next segments of the planned routes, and the control function uses accumulated information to adjust available resources at RESs on the planned routes (e.g. connected to an RBS on the routes).

In S210, one CE (e.g. CE 10) sends a message to the control function 20 in the network via the RBS to which it is connected (i.e. RBS-x) in order to report, as connection information, the next segment of its planned route (or the whole route). The corresponding route information may originate e.g. from the navigator of the vehicle or UE. The message comprise in the shown example also further parameters, e.g. information on possibly needed resources, as part of the connection information.

In S220, the control function 20 sends a response message to the CE 10 which may contain e.g. parameters regarding how the next connection information are to be provided.

In S230, the control function deduces, on the basis of the connection information received so far, at least one candidate for the next access point (RBS), e.g. RBS-x, wherein for example the received route information and or the resource requirement information of CE 10 are used. Furthermore, the control function 20 deduces possible requirements (e.g. service/resource needs) the CE 10 poses to one or more RES available at the selected RBS(s). According to some examples of embodiments, the control function 20 adds new requirements to a set of total requirements to the RES(s).

In S240, another CE (e.g. a CE2 being not shown in FIG. 1) sends a message to the control function 20 in the network via the RBS to which it is connected (e.g. again RBS-x) in order to report, as connection information, the next segment of its planned route (or the whole route). The corresponding route information may originate e.g. from the navigator of the vehicle or UE. The message may again comprise further parameters, e.g. information on possibly needed resources, as part of the connection information.

In S250, the control function 20 sends a response message to the other CE2 which may contain e.g. parameters regarding how the next connection information are to be provided.

It is to be noted that the sequence of S210 and S240 may be executed in a repeated manner, i.e. more than one set of connection information may be provided, before the next processing is conducted, wherein also more than two CEs may be involved.

In S260, the control function deduces, on the basis of the connection information received so far, at least one candidate for the next access points (RBS) for each CE of which connection information is received. According to some examples of embodiments, the control function selects a proper access point on the basis of the information. Furthermore, the control function 20 deduces possible requirements (e.g. service/resource needs) each CE poses to RES(s) available at the RBS(s), wherein new requirements are added to a set of total requirements to each RESs. When requirements for a given RES have changed enough (e.g. corresponding preset thresholds are exceeded or the like), the control function 20 prepares a message to enable the initiation of actions at the RES in question (e.g. scale-up, scale-out, scale-down or scale-in of resources, re-programming of programmable HW accelerators, downloading and/or activating of SW accelerators).

In S270, the control function 20 sends a message to the RES in question to enable this RES to take possibly required actions, e.g. scale-up, scale-out, scale-down or scale-in of resources, re-programming of programmable HW accelerators, downloading and/or activating of SW accelerators. Consequently, in S280, the RES in question heeds the received message and acts accordingly, e.g. reserves or adds (scale-up, scale-out) or reduces (scale-down, scale-in) resources, or re-programs programmable HW accelerators, downloads and/or activates SW accelerators, as per the indicated needs.

In S290 the RES sends a response to the message in S270.

Figure 5:
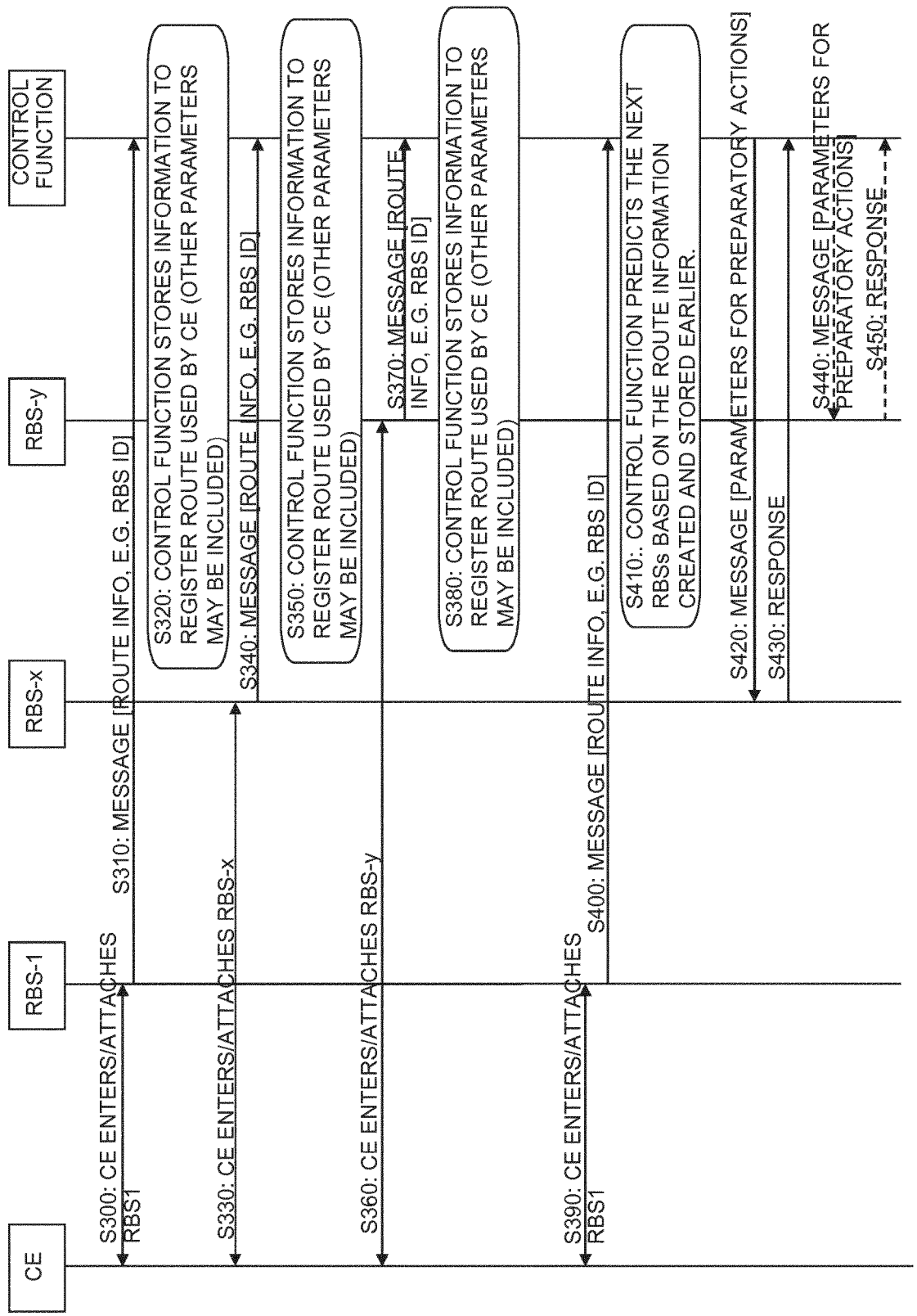
FIG. 5 shows a signaling diagram illustrating a further example of a procedure for optimizing communication network settings according to examples of embodiments of the invention.

FIG. 5 shows a signaling diagram illustrating a further example of a procedure for optimizing communication network settings according to examples of embodiments of the invention. Specifically, FIG. 5 is related to a case where CE (e.g. vehicle/UE) moves and handovers from one RBS to another take place, while the control function 20 registers the route e.g. as a sequence of used RBSs and uses the information at a later point of to predict the next required RBS. That is, the example according to FIG. 5 is related to a processing where connection information is acquired in the above mentioned alternative way, i.e. via access point signaling.

First, a procedure for acquiring connection information is described, i.e. how the control function 20 acquires information about typical routes of a given CE (e.g. CE 10).

In S300, the CE (e.g. CE 10) enters or attaches to an RBS (e.g. RBS-1). Due to this, in S310, the RBS-1 sends a message to the control function 20 in the network. The message contains for example a parameter or parameters indicating a route point of the CE 10 as route information of the vehicle or UE. An example of such a parameter is the ID of the RBS (RBS-1 ID).

In S320, the control function 20 stores the received route information to register the route used by the CE 10. According to example of embodiments, other parameters, e.g. the day of the week when the route information is received, may be included in the registration. This enables, for example, the registration of different routes for the CE.

In S330, the CE 10 enters or attaches to another RBS (e.g. RBS-x). Due to this, in S340, the RBS-x sends a message to the control function 20 in the network. The message contains for example a parameter or parameters indicating a route point of the CE 10 as route information of the vehicle or UE. An example of such a parameter is the ID of the RBS (RBS-x ID).

In S350, the control function 20 stores the received route information to register the route used by the CE 10 in a sequence to the previously stored route point related to RBS-1.

According to example of embodiments, other parameters, e.g. the day of the week when the route information is received, may be included in the registration.

In S360, the CE 10 enters or attaches to another RBS (e.g. RBS-y). Due to this, in S370, the RBS-y sends a message to the control function 20 in the network. The message contains for example a parameter or parameters indicating a route point of the CE 10 as route information of the vehicle or UE. An example of such a parameter is the ID of the RBS (RBS-y ID).

In S380, the control function 20 stores the received route information to register the route used by the CE 10 in a sequence to the previously stored route points related to RBS-1 and RBS-x. According to example of embodiments, other parameters, e.g. the day of the week when the route information is received, may be included in the registration.

It is to be noted that the sequence of S300 to S380 may be executed in a repeated manner, i.e. sets of connection information may be registered, before the next processing is conducted, wherein also more than one CE may be involved.

Next, a processing regarding how the control function uses the acquired information to predict the next RBS(s) to which the CE 10 may attach or make handover to at a later point of time is described.

Assuming that the processing of S300 to S380 has been completed, i.e. at least one route of the CE 10 is registered by the control function 20. Sometime later, in S390, CE 10 enters or attaches again to a RBS which the network has registered as belonging to a typical route of the CE 10, e.g. RBS-1. Consequently, in S400, the RBS-1 sends a message to the control function 20 in the network containing contains for example a parameter or parameters indicating this route point of the CE 10 as route information of the vehicle or UE (e.g. the ID of the RBS (RBS-1 ID)).

Then, in S410, the control function 20 deduces, i.e. predicts, the next RBSs (e.g. RBS-x) based on the route information created and stored earlier. The prediction process may use also other related parameters to predict the route, i.e. the next RBS(s). Such parameters may comprise e.g. the day of the week, time, a time window and/or the sequence of RBSs already visited during the present trip.

In S420, the control function 20 sends a message to the selected RBS (RBS-x) to enable this RBS to take possibly required actions, e.g. scale-up, scale-out of resources, resource reservation, handover preparation.

In S430 the RBS (RBS-x) sends a response to the message in S420.

Furthermore, in S440, in case more than one RBS is determined in S410, the control function 20 sends a message to the further selected RBS (RBS-y) to enable this RBS to take possibly required actions, e.g. scale-up, scale-out of resources, resource reservation, handover preparation.

In S450 the RBS (RBS-y) sends a response to the message in S440.

It is to be noted that measures described in connection with the examples of embodiments according to FIGS. 2 to 5 may be also combined in a suitable manner with each other. For example, the procedure according to FIG. 5 may be used in connection with elements of the procedure according to FIG. 4, i.e. RES may be also prepared.

According to examples of embodiments, the connection information which are reported by the CE to the control function include either both of route information indicating the planned route (or a segment of the planned route) and the resource requirement information (i.e. the indication of the assumed resource needs to the network), or only one of these elements. For example, a case where only the resource requirement information may be sufficient for the processing in the control function is when the CE is moving along a preset route, e.g. in case the vehicle is a train or the like where a location change of the route is not to be expected.

Furthermore, as indicated above, the CE may be of different types. For example, the CE may be a UE being a portable/standalone navigation device and communication unit, or a corresponding system integrated in a vehicle.

Furthermore, according to some examples of embodiments, it is possible that CEs located adjacent to each other, e.g. a vehicle and UEs of passengers traveling in the vehicle, communicate with each other in order to exchange information related to respective connection information. For example, a navigation and communication unit of a vehicle and a UE in the vehicle may communicate to exchange e.g. navigation and/or resource need information, and one of the units, either the navigation and communication unit of the vehicle or the UE, reports aggregated connection information, e.g. the planned route information and possible aggregated resource needs, to the network.

In further examples of embodiments, the network may use the provision of connection information (i.e. predictive route and/or resource need information) to prioritize users, i.e. the CEs like vehicles or UEs. For example, those CEs reporting such connection information to the network may get a higher priority in resource allocation, e.g. in case there is a congestion in the network.

According to some further examples of embodiments, the CE and the network (control function) may negotiate on whether the CE sends connection information (i.e. information on planned route(s)) to the network or not. Such negotiation may comprise a parameter exchange between the CE and the network e.g. during a CE-attach-to-network procedure or with a message while already attached. The CE may request a go-ahead or permission from the user in this connection for validating the negotiation. As a further option, the network (operator) may give a bonus or benefits, e.g. higher priorities, lower charging, for CEs/users that allow sending and using of their route information.

Similarly, according to some further examples of embodiments, the network may negotiate with the CE on whether the gathering (i.e. registration) of connection information, in particular route information concerning the CE is allowed or not. Such negotiation may comprise a parameter exchange between the CE and the network e.g. during a CE-attach-to-network procedure or with a message while already attached. The CE may request a go-ahead or permission from the user. The network (operator) may give a bonus or benefits, e.g. higher priorities, lower charging, for CEs/users that allow the gathering and using of their route information.

In further examples of embodiments, content, timing, and/or accuracy setting of the connection information provided to the network and registered there may be varied. For example, the sending of connection information (e.g. the planned route information by a CE (vehicle or UE) or the gathering of corresponding route information etc. of the CE by a network entity (control function) may be allowed and/or supported in a certain area and disallowed and/or not supported in another area. The network operator may for example introduce the feature in critical parts of the network to optimize the usage of resources. The CE/user may, e.g. to maintain privacy, negotiate the sending and/or gathering of connection information (e.g. route information) to be allowed in certain areas and otherwise, or in certain other areas, disallowed. For example, the user may only want to send data after a specific period or distance (away from his/her home), resulting in a "do not track" geo-zone. Also on arriving at the destination, the user may want to have a "do not track" geo zone. Alternatively or additionally, the connection information such as the route information may be provided with degraded reporting periods or less accurate position reporting. That is, rather than applying a total ban, i.e. a "do not track" geo-zone described above, a zone with limited accuracy is provided.

Furthermore, according to some examples of embodiments, the network, such as the control function, may generate control information indicating a preferred access point (e.g. a preferred RBS) which is to be selected by the CE as a next RBS when moving in the communication network. For example, based on the processing of a plurality of connection information from various CEs, the control function may decide that load balancing measures are required, so that a control or at least influencing of the CE regarding the next handover target may further increase an optimization level of communication network settings and performance. Thus, a corresponding instruction may be generated and send to the respective CE in a signaling. The CE may then consider the control information or instruction in the selection of a new RBS for handover, e.g. in an algorithm for selecting the following access point.

Figure 6:
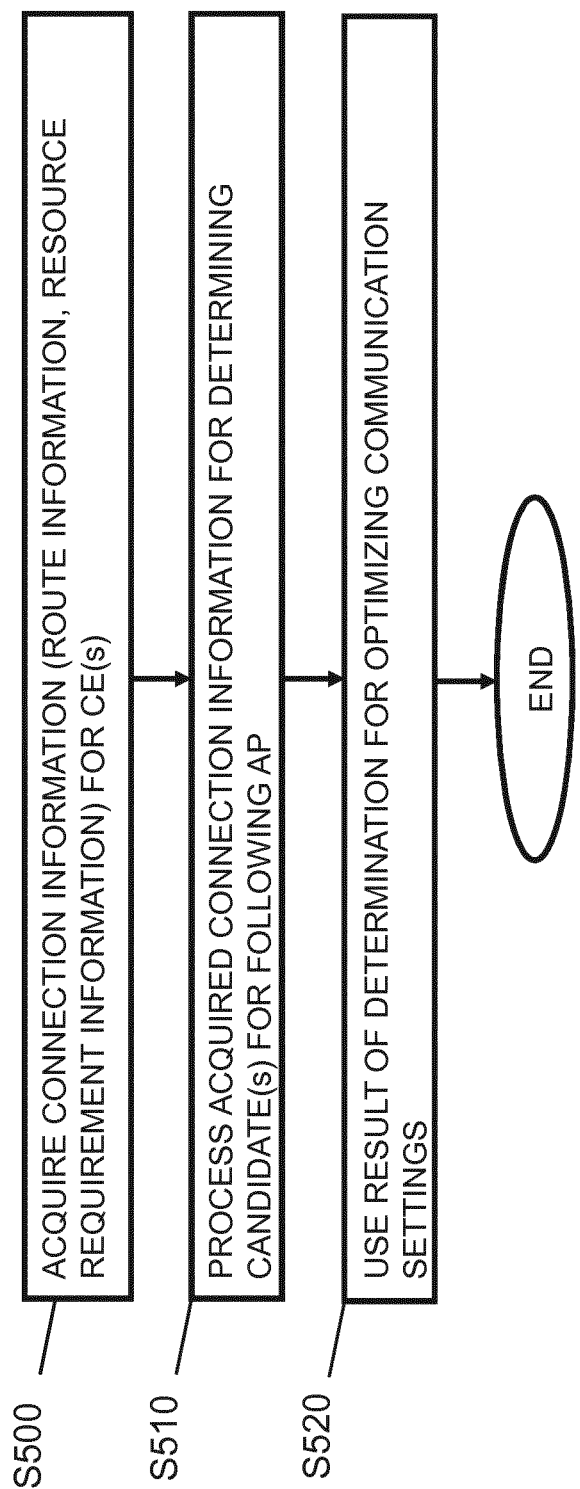
FIG. 6 shows a flow chart of a processing conducted in a control function according to some examples of embodiments.

FIG. 6 shows a flow chart of a processing for controlling and optimizing communication network settings according to some examples of embodiments. Specifically, the example according to FIG. 6 is related to a procedure conducted by a control function or element, such as the control function 20 in the architecture as depicted e.g. in FIG. 1.

In S500, connection information including route information and/or resource requirement information for at least one communication element (e.g. CE 10) in a coverage area of a communication network is acquired. The communication network is e.g. of a type as indicated in FIG. 1, i.e. it comprises a plurality of access points allowing the at least one communication element to communicate with the communication network.

For example, the connection information may be acquired by receiving and processing a corresponding signaling from a CE or the like. That is, route information and/or resource requirement information are indicated by the at least one CE. The route information comprises e.g. an indication of at least a segment of a planned route or the entirety of the planned route of the at least one CE which may move in the coverage area of the communication network. On the other hand, the resource requirement information may indicate assumed resource needs of one or more CE including the at least one CE sending the connection information.

In this context, according to some examples of embodiments, at least one of a trigger for providing the connection information by the at least one communication element, a requested size of the connection information and a requested content of the connection information is determined on the network side, wherein the determination is based on a network situation (e.g. current network situation or predicted network situation). The CE is then informed about the determination result, i.e. about the trigger for providing the connection information, the requested size of the connection information and/or the requested content of the connection information. In this connection, the trigger may be time based (i.e. indicating when connection information are to be provided) or location based (i.e. indicating where in a network the connection information is to be provided).

Alternatively, according to some examples of embodiments, the connection information is acquired in another way, in particular when connection information are provided by an access point, such as a RBS, for example. Then, for acquiring the connection information, a sequence of information elements is received and processed, wherein each information element indicates a route point of the at least one CE. The sequence of information elements is stored for registering at least one route of the at least one CE (i.e. a route is deduced on the basis of the route point sequence). From this registered route, route information for the CE is deduced. For example, an information element of the sequence of information elements indicating a route point of the at least one CE is received from an access point (e.g. the RBS) to which the CE is currently connected), wherein in this case the information element comprises preferably the ID of the access point to which the CE is currently connected (thereby allowing to track the route of the CE).

In S510, the acquired connection information (route information and/or resource requirement information) is processed for determining at least one candidate for a following access point to be connected to by the CE following to an access point to which the CE is currently connected. For example, according to some examples of embodiments, when processing the acquired connection information, at least one candidate for the following access point is predicted (with a certain probability, for example), or a specific access point is selected for the following access point.

According to some examples of embodiments, in the processing of the acquired connection information, at least one of service requirements and resource requirements for a communication of the CE with the determined candidate for the following access point is deduced. This may be done, for example, on the basis of the resource requirement information.

In S520, a result of the determination of the at least one candidate for a following access point is used for optimizing communication settings in the communication network for the CE moving in the communication network.

For example, according to some examples of embodiments, measures to be conducted for a communication with the CE by the determined candidate for the following access point and/or by the access point to which the CE is currently connected are determined, wherein the corresponding access point(s) (the determined candidate for the following access point and/or the access point to which the at least one communication element is currently connected) is/are informed about the determined measures for optimizing communication settings in the communication network for the at least one communication element (e.g. as a preparatory measure, as indicated above).

Alternatively or additionally, determining measures to be conducted for a communication with the CE by at least one application server connected to or integrated with the determined candidate for the following access point and/or the access point to which the at least one communication element is currently connected are determined. Similar to the above, the corresponding application server(s) is/are informed about the determined measures for optimizing communication settings in the communication network for the at least one communication element.

According to examples of embodiments, the measures to be conducted are related to one or more of the following measures: scaling-up of communication resources, scaling-out of communication resources, reserving of communication resources, preparing a handover of a communication connection of the CE, programming of one or more HW accelerators, downloading one or more SW accelerators, activating one or more SW accelerators.

Moreover, according to some examples of embodiments, when determining the measures to be conducted, impacts of a communication by another CE for which (similar) connection information is acquired on the determined candidate for the following access point and/or the access point to which the (original) CE is currently connected, and/or an application server connected to or integrated with the determined candidate for the following access point and/or the access point to which the CE is currently connected are considered. That is, the settings for the communication network are adapted in accordance with the presence (or absence) of other CEs and their requirements, if necessary (e.g. additional resources are added, or the like).

According to some further examples of embodiments, control information indicating a preferred access point to be selected by the CE as a following access point when moving in the communication network is generated on the basis of the result of the determination of the at least one candidate for a following access point for optimizing communication settings in the communication network. The generated control information is then transmitted to the CE. Thus, the selection of the next access point by the CE can be influenced, allowing e.g. an improved control with regard to load balancing, or the like.

According to further examples of embodiments, the CE(s) for which the connection information is acquired may be prioritized in comparison to other CE(s) communicating in the communication network for which no connection information is acquired. For example, prioritization may apply with regard to allocation of resources, or the like.

In some further examples of embodiments, negotiations with the CE regarding acquiring of the connection information for the CE may be conducted. The negotiation concerns for example whether the connection information is allowed to be acquired or not, in which locations the connection information is acquired or not, and/or at which time the connection information is acquired or not. Thus, "do not track" zones can be negotiated, wherein the user of the CE may be the instance validating the negotiation result.

According to some further examples of embodiments, when the above processing is implemented in a control function or control element of the communication network, the corresponding control function may be part of a dedicated server, a virtualized network function, a VM (in a cloud), a MEC server, a local/regional/centralized server, local/regional/centralized gateway, or the like. In this connection, the CE from which the connection information is acquired and processed may include a vehicle based communication device, a portable communication device, a UE, a V2X capable communication device, a navigation device, or the like.

Figure 7:
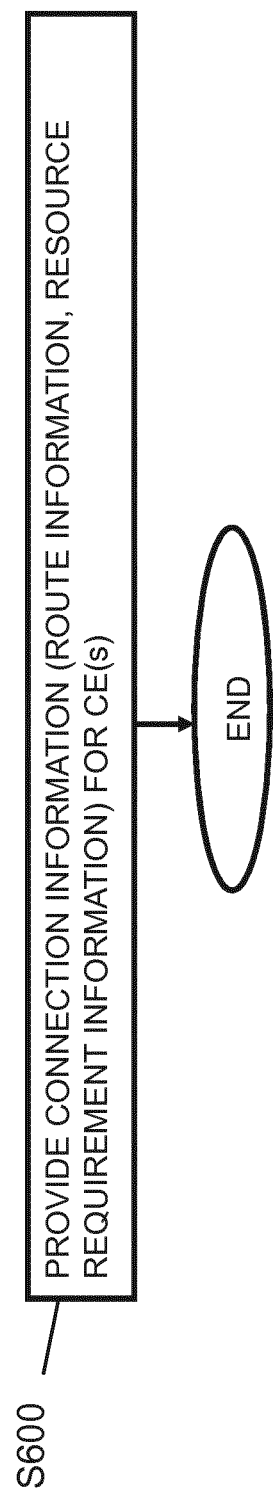
FIG. 7 shows a flow chart of a processing conducted in a communication element or base station according to some examples of embodiments.

FIG. 7 shows a flow chart of a processing for controlling and optimizing communication network settings according to some examples of embodiments. Specifically, the example according to FIG. 7 is related to a procedure conducted by a communication element or alternatively by an access point such as a BTS element, i.e. by the CE 10 or the BTS 30 in the architecture as depicted e.g. in FIG. 1.

In S600, connection information is provided to a control function of a communication network, wherein the connection information includes route information and/or resource requirement information for at least one CE in a coverage area of the communication network. The communication network may be of a type as depicted in FIG. 1, i.e. comprise a plurality of access points allowing the at least one CE to communicate with the communication network. According to some further examples of embodiments, the connection information are usable for determining at least one candidate for a following access point to be connected to by the at least one CE following to an access point to which the CE is currently connected (i.e. when the CE is moving in the communication network, for example) for optimizing communication settings in the communication network for the at least one CE.

Specifically, according to some further examples of embodiments, when the procedure is conducted on the side of a CE, such as CE 10 in FIG. 1, route information and/or resource requirement information is/are transmitted from the CE towards the network (the control function). According to some further examples of embodiments, the route information comprises an indication of at least a segment of a planned route (or the total planned route) of the CE in the coverage area of the communication network. On the other hand, the resource requirement information may indicate assumed resource needs of one or more communication elements including the CE sending the connection information.

In this context, according to some further examples of embodiments, an indication for a trigger for providing the connection information by the at least one communication element, a requested size of the connection information and/or a requested content of the connection information is received and processed on the CE side. The trigger, requested size and requested content may reflect a current or predicted network situation, wherein the trigger may be time based or location based.

On the other hand, according to some examples of embodiments, when the procedure is conducted in the access point side, e.g. in a RBS, an information element indicating a route point of the at least one CE is transmitted. The information element indicating a route point of the CE is sent from the access point to which the CE is currently connected, and comprises an ID of the access point to which the at least one communication element is currently connected. This allows the registration of a route by a sequence of route points being indicated in this manner.

According to some further examples of embodiments, control information indicating a preferred access point to be selected by the CE as a following access point when moving in the communication network is received and processed. The control information is then considered e.g. in an algorithm for selecting a following access point. Thus, the selection of the next access point by the CE can be influenced, allowing e.g. an improved control with regard to load balancing, or the like.

In some further examples of embodiments, negotiations with the control function regarding a provisioning of the connection information for the CE may be conducted. The negotiation concerns for example whether the connection information is to be provided or not, in which locations the connection information is to be provided or not, and/or at which time the connection information is to be provided or not. Thus, "do not track" zones can be negotiated, wherein the user of the CE may be the instance validating the negotiation result, e.g. by means of a corresponding permission input.

It is to be noted that according to some examples of embodiments, a content, a timing, an accuracy setting or the like of the connection information to be provided can be set in a variable manner. Thus, less accurate position control and the like can be set by a user, if desired.

Moreover, in some further examples of embodiments, a communication with at least one other CE is conducted for obtaining information regarding connection information related to the other CE. This is advantageous, for example, in case several UEs are traveling in one vehicle which itself represents a CE. The connection information being provided to the control function of the communication network may then comprise an aggregated set of connection information related to all of the communication elements.

According to some examples of embodiments, while the processing is conducted in an access point of the communication network or in the CE, the CE may include a vehicle based communication device, a portable communication device, a user equipment, a V2X capable communication device, a navigation device, or the like. The control function of the communication network may be part of at least one of a dedicated server, a virtualized network function, a virtual machine, a mobile edge computing server, a local/regional/centralized server, local/regional/centralized gateway.

Figure 8:
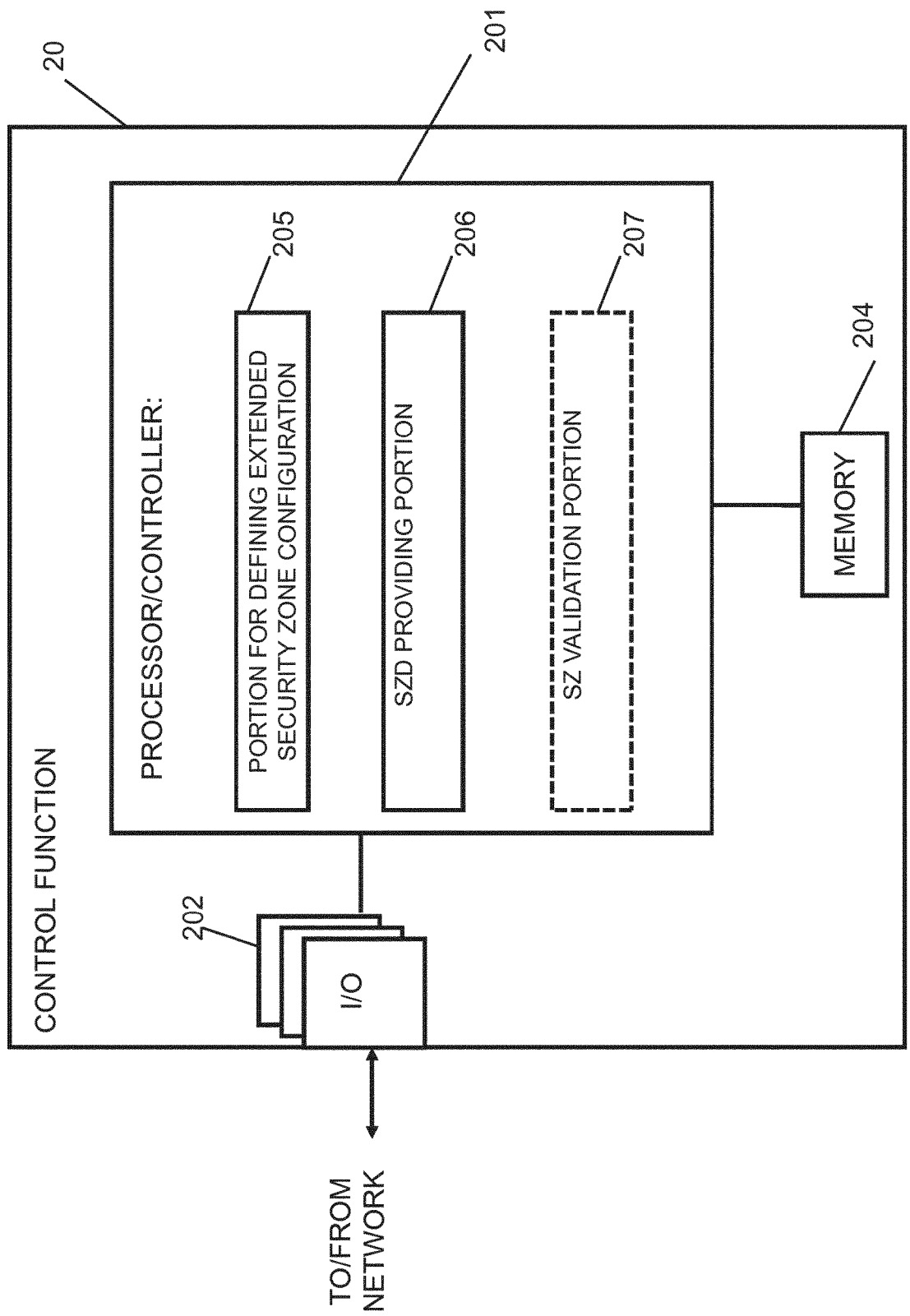
FIG. 8 shows a diagram of a network element or function acting as a control function according to some examples of embodiments.

FIG. 8 shows a diagram of a network element or function like a control function according to some examples of embodiments, which is configured to implement a procedure for controlling and optimizing communication network settings as described in connection with some of the examples of embodiments. It is to be noted that the network element, like the control element or function 20 of FIG. 1, may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The control function or element shown in FIG. 8 may include a processing circuitry, a processing function, a control unit or a processor 201, such as a CPU or the like, which is suitable for executing instructions given by programs or the like related to the control procedure. The processor 201 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 202 denotes input/output (I/O) units or functions (interfaces) connected to the processor or processing function 201. The I/O units 202 may be used for communicating with other entities or functions, as described in connection with FIG. 1, for example, such as the CE 10, the RBS(s) 30, the RES(s) 40, and the core network 50. The I/O units 202 may be a combined unit including communication equipment towards several entities, or may include a distributed structure with a plurality of different interfaces for different entities. Reference sign 204 denotes a memory usable, for example, for storing data and programs to be executed by the processor or processing function 201 and/or as a working storage of the processor or processing function 201. It is to be noted that the memory 204 may be implemented by using one or more memory portions of the same or different type of memory.

The processor or processing function 201 is configured to execute processing related to the above described procedure for controlling and optimizing communication network settings. In particular, the processor or processing circuitry or function 201 includes one or more of the following sub-portions. Sub-portion 205 is a processing portion which is usable as a portion for acquiring connection information. The portion 205 may be configured to perform processing according to S500 of FIG. 6. Furthermore, the processor or processing circuitry or function 201 may include a sub-portion 206 usable as a portion for processing the acquired connection information. The portion 206 may be configured to perform a processing according to S510 of FIG. 6. In addition, the processor or processing circuitry or function 201 may include a sub-portion 207 usable as a portion for using a result of the processing for optimizing communication settings. The portion 207 may be configured to perform a processing according to S520 of FIG. 6. Furthermore, the processor or processing circuitry or function 201 may include other sub-portions usable as portions for conducting processing as described in connection with FIG. 6, for example.

FIG. 9 shows a diagram of a network element or function like a communication element or RBS according to some examples of embodiments, which is configured to implement a procedure for controlling and optimizing communication network settings as described in connection with some of the examples of embodiments. It is to be noted that the network element, like the CE 10 or RBS 30 of FIG. 1, may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication element or RBS shown in FIG. 9 may include a processing circuitry, a processing function, a control unit or a processor 101, such as a CPU or the like, which is suitable for executing instructions given by programs or the like related to the control procedure. The processor 101 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 102 denotes input/output (I/O) units or functions (interfaces) connected to the processor or processing function 101. The I/O units 102 may be used for communicating with other entities or functions, as described in connection with FIG. 1, for example, such as the control function 20, the RBS(s) 30, the RES(s) 40, and the core network 50. The I/O units 102 may be a combined unit including communication equipment towards several entities, or may include a distributed structure with a plurality of different interfaces for different entities. Reference sign 104 denotes a memory usable, for example, for storing data and programs to be executed by the processor or processing function 101 and/or as a working storage of the processor or processing function 101. It is to be noted that the memory 104 may be implemented by using one or more memory portions of the same or different type of memory.

The processor or processing function 101 is configured to execute processing related to the above described procedure for controlling and optimizing communication network settings. In particular, the processor or processing circuitry or function 101 includes one or more of the following sub-portions. Sub-portion 105 is a processing portion which is usable as a portion for providing connection information. The portion 105 may be configured to perform processing according to S600 of FIG. 7. Furthermore, the processor or processing circuitry or function 101 may include other sub-portions usable as portions for conducting processing as described in connection with FIG. 7, for example.

As described above, according to examples of embodiments, procedures allowing to adapt a communication network to requirements of a moving communication element are provided, wherein settings in the communication network can be optimized. By means of the proposed procedures described above, it is possible to provide a better quality of experience for customers, while the usage of network resources, in particular in a dynamic environment like a virtualized environment, can be optimized. Furthermore, already existing features and properties of CEs like vehicles, terminals/UEs and networks can be reused, for example navigators in vehicles or UEs, control plane signaling messages between vehicles/UEs and network, and the like. The various embodiments described above can be used or applied separately or independently or in different combinations. For example, it is feasible that a system employing a control procedure according to examples of embodiments, such as a vehicle-to-network system, to support different approaches in different circumstances/conditions. Furthermore, the system configuration of examples of embodiments can be employed in a flexible manner, for example a control function and applications may run on a dedicated server, in a cloud environment as a VNF, on a MEC server as a local service, on a 5G (local, regional or centralized) server/gateway, and the like.

Examples of embodiments can be implemented in different systems and environments. For example, measures and functions based on examples of embodiments of the invention may be applicable in connection with NFV standardization in ETSI, MEC standardization in ETSI. According to examples of embodiments, an optimized resource handling in a virtualized environment is achievable, wherein actions conducted in the virtualized environment may comprise (without being limited thereto) e.g. scale-up, scale-out, scale-down or scale-in of resources, re-programming of programmable HW accelerators, downloading and/or activating of SW accelerators, and the like. A further field of implementation of examples of embodiments can be found in particular in the realm of the Vehicle-to-X/FS V2X LTE work item, vehicle to network communication where a prediction of the next base station(s) may be beneficial.

In addition, according to another example of embodiments, there is provided an apparatus comprising means for acquiring connection information including at least one of route information and resource requirement information for at least one communication element in a coverage area of a communication network, the communication network comprising a plurality of access points allowing the at least one communication element to communicate with the communication network, means for processing the acquired connection information for determining at least one candidate for a following access point to be connected to by the at least one communication element following to an access point to which the at least one communication element is currently connected, and means for using a result of the determination of the at least one candidate for a following access point for optimizing communication settings in the communication network for the at least one communication element moving in the communication network.

Furthermore, according to some other examples of embodiments, the above defined apparatus may further comprise means for conducting at least one of the processing defined in the above described methods, for example a method according that described in connection with FIG. 6.

Moreover, according to another example of embodiments, there is provided an apparatus comprising means for providing connection information to a control function of a communication network, the connection information including at least one of route information and resource requirement information for at least one communication element in a coverage area of the communication network, the communication network comprising a plurality of access points allowing the at least one communication element to communicate with the communication network, the connection information being usable for determining at least one candidate for a following access point to be connected to by the at least one communication element following to an access point to which the at least one communication element is currently connected for optimizing communication settings in the communication network for the at least one communication element moving in the communication network.

Furthermore, according to some other examples of embodiments, the above defined apparatus may further comprise means for conducting at least one of the processing defined in the above described methods, for example a method according that described in connection with FIG. 7.

It should be appreciated that
  an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C #, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. An apparatus including:
at least one processing circuitry, and
at least one memory for storing instructions to be executed by the processing circuitry,
wherein the at least one memory and the instructions are configured to, with the at least one processing circuitry, cause the apparatus at least to:
acquire connection information including at least one of route information and resource requirement information for at least one communication element in a coverage area of a communication network, the communication network comprising a plurality of access points allowing the at least one communication element to communicate with the communication network,
process the acquired connection information for determining at least one candidate for a following access point to be connected to by the at least one communication element following to an access point to which the at least one communication element is currently connected, and
use a result of the determination of the at least one candidate for a following access point for optimizing communication settings in the communication network for the at least one communication element moving in the communication network, wherein the at least one memory and the instructions are further configured to, with the at least one processing circuitry, cause the apparatus at least to:
determine measures to be conducted for a communication with the at least one communication element by at least one application server connected to or integrated with at least one of the determined at least one candidate for the following access point and the access point to which the at least one communication element is currently connected, and
inform the at least one application server about the determined measures for optimizing communication settings in the communication network for the at least one communication element.

2. The apparatus according to claim 1, wherein the at least one memory and the instructions are further configured to, with the at least one processing circuitry, cause the apparatus at least:
to receive and process, for acquiring the connection information, at least one of route information and resource requirement information from the at least one communication element,
wherein the route information comprises an indication of at least a segment of a planned route of the at least one communication element in the coverage area of the communication network, and
wherein the resource requirement information indicates assumed resource needs of one or more communication elements including the at least one communication element.

3. The apparatus according to claim 2, wherein the at least one memory and the instructions are further configured to, with the at least one processing circuitry, cause the apparatus at least to:
determine at least one of a trigger for providing the connection information by the at least one communication element, a requested size of the connection information and a requested content of the connection information, on the basis of a network situation, and
inform the at least one communication element about the at least one of the trigger for providing the connection information, the requested size of the connection information and the requested content of the connection information,
wherein the trigger is time based or location based.

4. The apparatus according to claim 1, wherein the at least one memory and the instructions are further configured to, with the at least one processing circuitry, cause the apparatus at least to:
receive and process, for acquiring the connection information, a sequence of information elements each indicating a route point of the at least one communication element, store the sequence of information elements for registering at least one route of the at least one communication element, and deduce route information for the at least one communication element from the registered at least one route.

5. The apparatus according to claim 4, wherein an information element of the sequence of information elements indicating a route point of the at least one communication element is received from an access point to which the at least one communication element is currently connected, and comprises an identification element of the access point to which the at least one communication element is currently connected.

6. The apparatus according to claim 1, wherein the at least one memory and the instructions are further configured to, with the at least one processing circuitry, cause the apparatus at least to:

predict, when processing the acquired connection information, at least one candidate for the following access point, or to select a specific access point for the following access point.

7. The apparatus according to claim 1, wherein the at least one memory and the instructions are further configured to, with the at least one processing circuitry, cause the apparatus at least to:

deduce, when processing the acquired connection information, at least one of service requirements and resource requirements for a communication of the at least communication element with the determined at least one candidate for the following access point.

8. The apparatus according to claim 1, wherein the at least one memory and the instructions are further configured to, with the at least one processing circuitry, cause the apparatus at least to:

determine measures to be conducted for a communication with the at least one communication element by at least one of the determined at least one candidate for the following access point and the access point to which the at least one communication element is currently connected, and inform the at least one of the determined at least one candidate for the following access point and the access point to which the at least one communication element is currently connected about the determined measures for optimizing communication settings in the communication network for the at least one communication element.

9. The apparatus according to claim 8, wherein the measures to be conducted are related to at least one of scaling-up of communication resources, scaling-out of communication resources, reserving of communication resources, preparing a handover of a communication connection of the at least one communication element, programming of at least one hardware accelerator, downloading of at least one software accelerator, and activating of at least one software accelerator.

10. The apparatus according to claim 8, wherein the at least one memory and the instructions are further configured to, with the at least one processing circuitry, cause the apparatus at least to:

consider, when determining the measures to be conducted, impacts of a communication by another communication element for which connection information is acquired on at least one of the determined at least one candidate for the following access point, the access point to which the at least one communication element is currently connected and an application server connected to or integrated with at least one of the determined at least one candidate for the following access point and the access point to which the at least one communication element is currently connected.

11. The apparatus according to claim 1, wherein the at least one memory and the instructions are further configured to, with the at least one processing circuitry, cause the apparatus at least to:

generate control information indicating a preferred access point to be selected by the at least one communication element as a following access point when moving in the communication network on the basis of the result of the determination of the at least one candidate for a following access point for optimizing communication settings in the communication network, and cause transmission of the generated control information to the at least one communication element.

12. The apparatus according to claim 1, wherein the at least one memory and the instructions are further configured to, with the at least one processing circuitry, cause the apparatus at least to:

prioritize the at least one communication element for which the connection information is acquired in comparison to another communication element communicating in the communication network for which no connection information is acquired.

13. An apparatus including:

at least one processing circuitry, and at least one memory for storing instructions to be executed by the processing circuitry, wherein the at least one memory and the instructions are configured to, with the at least one processing circuitry, cause the apparatus at least to:

provide connection information to a control function of a communication network, the connection information including at least one of route information and resource requirement information for at least one communication element in a coverage area of the communication network, the communication network comprising a plurality of access points allowing the at least one communication element to communicate with the communication network, the connection information being usable for determining at least one candidate for a following access point to be connected to by the at least one communication element following to an access point to which the at least one communication element is currently connected, determining measures to be conducted for a communication with the at least one communication element by at least one application server connected to or integrated with at least one of the determined at least one candidate for the following access point and the access point to which the at least one communication element is currently connected, and informing the at least one application server about the determined measures for optimizing communication settings in the communication network for the at least one communication element for optimizing communication settings in the communication network for the at least one communication element moving in the communication network.

14. The apparatus according to claim 13, wherein the at least one memory and the instructions are further configured to, with the at least one processing circuitry, cause the apparatus at least:

to cause transmission of at least one of route information and resource requirement information from the at least one communication element, wherein the route information comprises an indication of at least a segment of a planned route of the at least one communication element in the coverage area of the communication network, and wherein the resource requirement information indicates assumed resource needs of one or more communication elements including the at least one communication element.

15. The apparatus according to claim 14, wherein the at least one memory and the instructions are further configured to, with the at least one processing circuitry, cause the apparatus at least:

to receive and process at least one of a trigger for providing the connection information by the at least one communication element, a requested size of the connection information and a requested content of the connection information, on the basis of a network situation, wherein the trigger is time based or location based.

16. The apparatus according to claim 13, wherein the at least one memory and the instructions are further configured to, with the at least one processing circuitry, cause the apparatus at least:

to cause transmission of an information element indicating a route point of the at least one communication element.

17. The apparatus according to claim 16, wherein the information element indicating a route point of the at least one communication element is sent from an access point to which the at least one communication element is currently connected, and comprises an identification element of the access point to which the at least one communication element is currently connected.

18. The apparatus according to claim 13, wherein the at least one memory and the instructions are further configured to, with the at least one processing circuitry, cause the apparatus at least to:

receive and process control information indicating a preferred access point to be selected by the at least one communication element as a following access point when moving in the communication network, and consider the control information in an algorithm for selecting a following access point.

19. The apparatus according to claim 13, wherein the at least one memory and the instructions are further configured to, with the at least one processing circuitry, cause the apparatus at least to:

conduct a negotiation with the communication network regarding a provision of the connection information for the at least one communication element, wherein the negotiation concerns at least one of whether the connection information is allowed to be provided or not, in which locations the connection information is to be provided or not, at which time the connection information is to be provided or not.

20. The apparatus according to claim 19, wherein the negotiation is based on an input of a user of the at least one communication element.

21. The apparatus according to claim 13, wherein the at least one memory and the instructions are further configured to, with the at least one processing circuitry, cause the apparatus at least to:

set variably at least one of a content, a timing, and an accuracy setting of the connection information.

22. An apparatus including:

at least one processing circuitry, and at least one memory for storing instructions to be executed by the processing circuitry, wherein the at least one memory and the instructions are configured to, with the at least one processing circuitry, cause the apparatus at least to:

acquire connection information including at least one of route information and resource requirement information for at least one communication element in a coverage area of a communication network, the communication network comprising a plurality of access points allowing the at least one communication element to communicate with the communication network, process the acquired connection information for determining at least one candidate for a following access point to be connected to by the at least one communication element following to an access point to which the at least one communication element is currently connected, and use a result of the determination of the at least one candidate for a following access point for optimizing communication settings in the communication network for the at least one communication element moving in the communication networks, wherein an information element of a sequence of information elements indicating a route point of the at least one communication element is received from an access point to which the at least one communication element is currently connected, and comprises an identification element of the access point to which the at least one communication element is currently connected.

* * * * *